United States Patent [19]
Bradford et al.

[11] 3,985,854
[45] Oct. 12, 1976

[54] RECOVERY OF PT/RH FROM CAR EXHAUST CATALYSTS

[75] Inventors: Christopher William Bradford; Stephen George Baldwin, both of London, England

[73] Assignee: Johnson Matthey & Co., Limited, London, England

[22] Filed: May 29, 1975

[21] Appl. No.: 581,889

[30] Foreign Application Priority Data
June 12, 1974   United Kingdom............... 26043/74

[52] U.S. Cl.................................. 423/22; 75/102; 75/114; 75/121; 252/415
[51] Int. Cl.²........................................ C01G 55/00
[58] Field of Search ............... 423/22; 75/121, 102, 75/114; 252/415

[56] References Cited
UNITED STATES PATENTS

| | | | |
|---|---|---|---|
| 2,344,208 | 3/1944 | Kirkpatrick ......................... | 252/415 |
| 2,805,941 | 9/1957 | Tucker................................. | 423/22 |
| 2,830,877 | 4/1958 | Appell ................................. | 423/22 |
| 2,863,760 | 12/1958 | Ashley et al. ....................... | 423/22 |
| 3,488,144 | 1/1970 | Sargent............................... | 423/22 |
| 3,660,306 | 5/1972 | Sennewald et al................. | 252/415 |
| 3,694,376 | 9/1972 | Kalrisch et al...................... | 252/415 |
| 3,876,747 | 4/1975 | Pittie et al. ......................... | 423/22 |

*Primary Examiner*—Herbert T. Carter
*Attorney, Agent, or Firm*—Cushman, Darby & Cushman

[57] ABSTRACT

In order to recover platinum, rhodium and other precious metals from catalysts employed in internal combustion engine exhaust systems, the used or unused catalysts, preferably in crushed, powdered or broken form, are reacted with an acidic medium having oxidizing properties to leach out the precious metals. The acidic medium may be an acid containing or oxidizing agent or an oxidizing acid and when a used catalyst is treated the leaching step is preferably preceded by a reduction step in order to convert to the metal any precious metal oxides present in the catalyst.

9 Claims, No Drawings

RECOVERY OF PT/RH FROM CAR EXHAUST CATALYSTS

This invention relates to the recovery of precious metal values from catalysts. More particularly, the invention is concerned with the recovery of precious metals from catalysts employed in internal combustion engine exhaust systems, especially for the purpose of oxidising carbon monoxide and unburnt hydrocarbons.

With increasing interest and legalisation in many countries concerning permissible levels of air pollutants, means to control the noxious content of automobile exhaust gases are being developed. Basically, two such means are envisaged: those that are based on preventive concepts and those based on destructive concepts. At the present level of technological knowledge, preventive methods are not sufficiently effective and, of the destructive methods available, catalytice reactors, which oxidise carbon monoxide and unburnt hydrocarbons and reduce oxides of nitrogen, seem to be the most efficient.

Catalyst units for the above reactions generally comprise a layer of alumina, or other oxide material containing a precious metal catalyst and deposited on an inert refractory support. The precious metal catalyst is typically platinum and it may be promoted with one or more other metals to render the catalyst effective for the particular reaction concerned. For oxidation reactions, a preferred promoter metal is rhodium and for reduction reactions, ruthenium.

Estimates have been made of the amounts of precious metals which will be needed in the future for these catalysts and it has been shown that, unless substantial amounts of the metals are recovered from the used catalysts, a massive increase in precious metal production will be required.

It is therefore, the principal object of the present invention to provide a process for the recovery of precious metal values from catalysts which have been used in internal combustion engine exhaust systems.

According to the invention, a process for the recovery of precious metals from a catalyst employed in the conversion of exhaust gases from internal combustion engines includes the step of reacting the catalyst with an acidic medium which has oxidising properties, to leach out the precious metals. This medium may be an acid containing an oxidising agent or it may be simply an oxidising acid.

Before the leaching process is carried out, the catalyst is preferably either crushed, ground to a powder or broken into small pieces.

The oxidising agent may either be a halogen, or a salt of an oxoacid of a halogen. The preferred halogen is bromine, due to the fact that it is a liquid at ordinary temperatures and atmospheric pressure and may, therefore, readily be used either in a refluxing reaction medium or in a continuous condensation - recycling extraction apparatus, such as a Soxhlet extractor. The use of chlorine as the halogen is complicated by the fact that a continuous supply is needed.

A small quantity of iodine may be optionally included in the reaction medium when bromine or chlorine is used as the oxidising agent.

An example of a suitable oxidising acid is boiling aqua regia.

Leaching times may vary between about 1½ hours and about 24 hours. We have found that, on subjecting unused catalyst containing approximately 92.5% platinum and 7.5% rhodium supported on a cordierite honeycomb structure to one or other of the leaching conditions described above, more than 95% of the platinum could be recovered from the catalyst.

We have observed by means of an electron microscope that the use of a catalyst in the exhaust system of an internal combustion engine leads to the development of differences in the sizes of the precious metal particles. For instance, in an unused catalyst the platinum and rhodium are evenly distributed throughout the wash-coat as particles of less than 0.0025 microns in diameter. A catalyst which had been used for 3,000 miles at an average 30 m.p.h. still retained the metal particles in the wash-coat but their diameters had increased to 0.1 micron. Furthermore, the surface of the larger particles tended to be rich in rhodium. A catalyst which had been used for 30,000 miles also retained the metal particles in the wash-coat, but their diameters had still further increased to 0.5 microns and discrete crystals of rhodium oxide were visible on their surfaces.

We have also found that attempting to recover precious metals from a used catalyst yielded results which were markedly inferior, especially with respect to rhodium extraction, than corresponding tests on an unused catalyst.

It is a well-known fact that rhodium oxide, $Rh_2O_3$, unlike finely divided rhodium metal, is substantially insoluble in acid under oxidising conditions. This would account for the poor dissolution of rhodium from used catalysts. It is thought that the rhodium oxide on the surface of the particles of the used catalysts acts as a protecting layer and thereby inhibits dissolution of the platinum from the centre of the particles by the oxidising acid.

According to a further feature of the invention, therefore, a reduction step is carried out prior to the leaching step, in order to convert to the metal any precious metal oxides present in the used catalyst.

One way of carrying out the reduction step is to treat the crushed or powdered catalyst with hydrazine hydrate in boiling dilute caustic soda solution. Typically, a 20g sample of crushed catalyst is treated for ten minutes in 100ml of a 1% sodium hydroxide solution containing 1ml of a 60% hydrazine hydrate solution.

It was found that recovery of platinum and rhodium by leaching from a used car exhaust catalyst could be considerably improved by a prior reduction process step. Using a combination of a hydrogen reduction step and a hydrochloric acid/bromine leach in a Soxhlet extractor, recovery of both platinum and rhodium exceeded 99%.

The following experimental results and the associated table illustrate the effectiveness of the invention in recovering precious metal values from both used and unused catalysts.

GROUP 1

Unused catalyst.

These tests were carried out either on powdered or crushed sections of catalysts which had not been used in an internal combustion engine exhaust system. The precious metal analysis of the unused catalyst was:

| Powder | Pt 0.133% | Rh 0.012% |

| | | |
|---|---|---|
| -continued | | |
| Crushed section | Pt 0.289% | Rh 0.024% |

Analyses were performed by X-ray fluorescence. Test details were as follows:

EXAMPLE 1

40g of powdered catalyst was stirred in 200ml of 1:1 hydrochloric acid at 60° C and chlorine was bubbled into the reaction mixture over a period of 3 hours.

EXAMPLE 2

As (1) except that 2g of iodine was also added to the reaction mixture.

EXAMPLE 3

As (1) except that, instead of chlorine, 10ml of bromine was added before refluxing for 3 hours.

EXAMPLE 4

As (3) except that 2g of iodine was also added to the reaction mixture.

EXAMPLE 5

40g of powdered catalyst was stirred in 200ml of concentrated hydrochloric acid at 70° C and 100ml of 10% aqueous sodium chlorate solution was added dropwise to the reaction mixture over one hour. The mixture was boiled for a further hour.

EXAMPLE 6

As (5) except that sodium bromate was substituted for sodium chlorate.

EXAMPLE 7

As (5) except that the catalyst was crushed.

EXAMPLE 8

As (6) except that the catalyst was crushed.

GROUP II

Used catalyst.

The following tests were carried out on a catalyst that had been in service in an internal combustion engine exhaust system for 18,500 miles. The precious metal analysis of the catalyst was Pt 0.149% Rh 0.010%

EXAMPLE 9

The conditions were identical to Example (1), i.e. 40g powdered catalyst, 200ml of 1:1 HCl at 60° C; $Cl_2$ passed for 3 hours.

EXAMPLE 10

The conditions were identical to Example (5), i.e. 40g powdered catalyst, 200ml conc. HCl at 70° C, 100ml of 10% sodium chlorate solution added over 1 hour, followed by boiling for 1 hour.

EXAMPLE 11

As (10) except that sodium bromate was substituted for sodium chlorate.

EXAMPLE 12

40g of catalyst pieces were extracted in a Soxhlet apparatus for 20 hours with 1:1 hydrochloric acid and 2ml of bromine, further additions of bromine being made as necessary.

EXAMPLE 13

As (10) except that the catalyst was pre-reduced with hydrogen at 700° C for 2 hours.

GROUP III

Used catalyst.

The catalyst used for these tests had been in service for 31,000 miles and analysed as follows:
Pt 0.634%: Rh 0.052%
20g samples of crushed catalyst were used for these tests, instead of the previous 40g.

EXAMPLE 14

The conditions were identical to Examples (5) and (10), i.e. 100 ml conc. HCl at 70° C, 50ml of 10% sodium chlorate solution added over 1 hour, followed by boiling for 1 hour.

EXAMPLE 15

The catalyst was boiled in 100ml of aqua regia for 30 minutes, after which a further 60ml of acid was added over 1 hour, while maintaining the boiling.

EXAMPLE 16

As (14) except that the catalyst was pre-reduced with hydrogen at 700° C for 2 hours.

EXAMPLE 17

As (14) except that the catalyst was pre-reduced by boiling for 10 minutes in 100ml of 1% sodium hydroxide solution containing 1ml of 60% hydrazine hydrate solution.

EXAMPLE 18

As (15) but the catalyst was pre-reduced in sodium hydroxide and hydrazine.

GROUP IV

Used catalyst.

The catalyst used for these tests had been in service for 26,500 miles and analysed as follows:
Pt 0.351%: Rh 0.036%

EXAMPLE 19

Pieces of the catalyst to a total weight of 16.1g, were extracted in a Soxhlet apparatus for 20 hours with 1:1 hydrochloric acid and 1ml of bromine, further additions of bromine being made as necessary.

EXAMPLE 20

As (19) except that the catalyst was pre-reduced with hydrogen at 700° C for 2 hours. The total catalyst weight was 13.4g.

EXAMPLE 21

As (20) except that the extraction time was 14½ hours instead of 20. The total catalyst weight was 12.2g.

It is to be understood that modifications to the process may be introduced without departing from the scope of the invention to improve further the efficiency of recovery of precious metals. For instance, a physical pre-treatment step may be considered desirable prior to the reduction or leach stages to concentrate the majority of the precious metal values in a smaller bulk of catalyst.

The following table gives the results of all the tests detailed in Examples 1 – 21.

| GROUP | EXAMPLE | TEST CONDITIONS | RESIDUE (g) | Pt% In RESIDUE | Pt% DISSOLVED | Rh% In RESIDUE | Rh% DISSOLVED |
|---|---|---|---|---|---|---|---|
| I | 1 | $HCl/Cl_2$ | 36.1 | < 0.001 | > 99.3 | < 0.001 | > 92 |
|  | 2 | $HCl/Cl_2 + I_2$ | 35.9 | < 0.001 | > 99.3 | < 0.001 | > 92 |
|  | 3 | $HCl/Br_2$ | 36.5 | 0.004 | 97.2 | 0.002 | 84.8 |
|  | 4 | $HCl/Br_2 + I_2$ | 36.8 | 0.004 | 97.2 | 0.002 | 84.7 |
|  | 5 | $HCl/NaClO_3$ | 34.4 | 0.002 | 98.8 | < 0.001 | > 93 |
|  | 6 | $HCl/NaBrO_3$ | 34.4 | 0.003 | 98.1 | < 0.001 | > 93 |
|  | 7 | As 5; cat. crushed | 37.5 | 0.002 | 99.4 | 0.001 | 96 |
|  | 8 | As 6; cat. crushed | 37.8 | 0.001 | 99.7 | < 0.001 | > 96 |
| II | 9 | $HCl/Cl_2$ | 39.0 | 0.096 | 37.0 | 0.010 | 3 |
|  | 10 | $HCl/NaClO_3$ | 38.8 | 0.009 | 94.4 | 0.007 | 32 |
|  | 11 | $HCl/NaBrO_3$ | 38.7 | 0.012 | 92.2 | 0.008 | 22 |
|  | 12 | $HCl/Br_2$: Soxhlet | 32.8 | 0.003 | 98.4 | 0.003 | 75 |
|  | 13 | $H_2/HCl/NaClO_3$ | 39.1 | 0.003 | 98.1 | 0.006 | 41 |
| III | 14 | $HCl/NaClO_3$ | 19.6 | 0.023 | 96.5 | 0.007 | 87 |
|  | 15 | Aqua regia | 19.3 | 0.058 | 92.6 | 0.008 | 86 |
|  | 16 | $H_2/HCl/NaClO_3$ | 19.4 | 0.006 | 99.0 | 0.001 | 98.1 |
|  | 17 | $N_2H_4/HCl/NaClO_3$ | 19.4 | 0.008 | 98.8 | 0.003 | 94.6 |
|  | 18 | $N_2H_4$ aqua regia | 19.3 | 0.011 | 98.3 | 0.005 | 90.5 |
|  | 19 | $HCl/Br_2$: Soxhlet 20 hrs. | 12.8 | 0.006 | 98.5 | 0.002 | 95.6 |
|  | 20 | $H_2/HCl/Br_2$: Soxhlet 20 hrs. | 10.2 | 0.003 | 99.4 | 0.0004 | 99.2 |
|  | 21 | $H_2/HCl/Br_2$: Soxhlet 14½ hrs. | 10.2 | 0.003 | 99.3 | 0.0006 | 98.7 |

We claim:
1. A process for recovering at least one precious metal from the group consisting of platinum and rhodium from a catalyst containing same employed in the conversion of exhaust gases from internal combustion engines, said process comprising the step of reacting the catalyst with a mixture of HCl and bromine to leach out said metal.

2. A process according to claim 1, comprising mixing the catalyst with hydrochloric acid and adding bromine to the reaction mixture.

3. A process according to claim 2, wherein iodine is also added to the reaction mixture.

4. A process according to claim 2, comprising the step of reducing the catalyst to particulate form prior to mixing with the acid.

5. A process according to claim 4, wherein said mixing reaction is carried out at 60° C.

6. A process according to claim 1, wherein the catalyst includes rhodium oxide and the process comprises the step of reducing said oxide to rhodium metal prior to reacting the catalyst with the HCl and bromine.

7. A process according to claim 6, wherein said reduction is effected with hydrogen at 750° C.

8. A process according to claim 6, wherein said reduction is effected by boiling in a 1% sodium hydroxide solution containing 1% by volume of a 60% hydrazine hydrate solution.

9. A process according to claim 1 which is carried out in a continuous condensation-recycling extraction apparatus.

* * * * *